United States Patent [19]

Hamilton

[11] E Re. 28,965

[45] Reissued Sept. 21, 1976

[54] FLOW THROUGH TYPE DRYING APPARATUS

[75] Inventor: William H. Hamilton, Philadelphia, Pa.

[73] Assignee: Pennwalt Corporation, Philadelphia, Pa.

[22] Filed: Feb. 29, 1968

[21] Appl. No.: 710,443

Related U.S. Patent Documents

Reissue of:

[64] Patent No.: 3,238,638
Issued: Mar. 8, 1966
Appl. No.: 178,356
Filed: Mar. 8, 1962

[52] U.S. Cl. ..... 34/92; 34/5; 34/174; 34/233

[51] Int. Cl.[2] ..... F26B 13/30

[58] Field of Search ..... 34/5, 92, 174, 233

[56] References Cited

UNITED STATES PATENTS

| | | | |
|---|---|---|---|
| 1,086,950 | 2/1914 | Stanton | 34/15 |
| 1,207,763 | 12/1916 | Jaeger | 34/92 |
| 1,577,709 | 3/1926 | Glessner | 34/92 |
| 2,156,845 | 5/1939 | Gentele | 34/92 |
| 2,283,319 | 5/1942 | Dienst | 34/65 |
| 2,486,876 | 11/1949 | Protzeller | 34/5 X |
| 2,605,692 | 8/1952 | Kranick | 34/174 |
| 3,010,216 | 11/1961 | Ravet | 34/92 |
| 3,057,078 | 10/1962 | Gold | 34/48 |
| 3,077,036 | 2/1963 | Neumann | 34/5 |
| 3,238,638 | 3/1962 | Hamilton | 34/92 |

*Primary Examiner*—Kenneth W. Sprague
*Assistant Examiner*—James C. Yeung
*Attorney, Agent, or Firm*—Charles N. Quinn

[57] ABSTRACT

*Apparatus for method of vacuum freeze-drying frozen granular material in spaced, substantially vertical product beds is provided by vertical cell units designed for this purpose. Sublimed water vapors are conveyed from the product beds to the condensing area by open spaces between said product beds. The open spaces contain heating means for supplying heat of sublimation to the frozen material within the product beds.*

9 Claims, 5 Drawing Figures

FIG.2
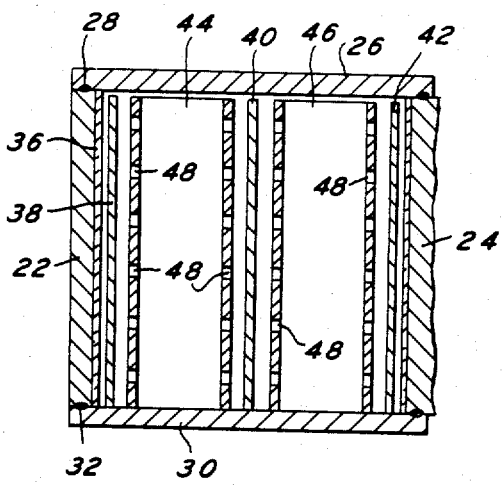
FIG. 4
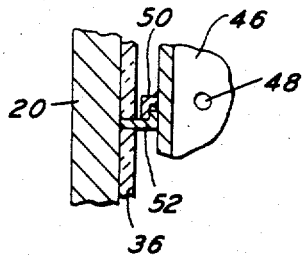
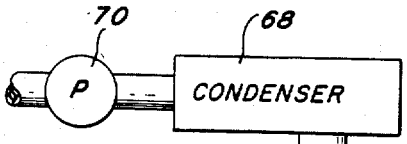
FIG.3
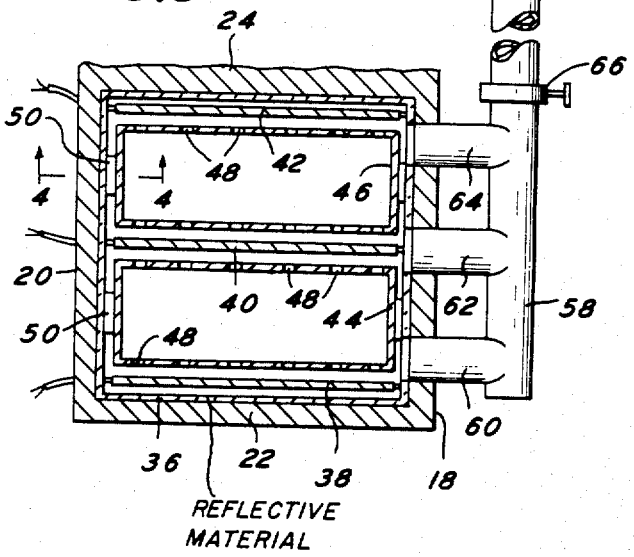
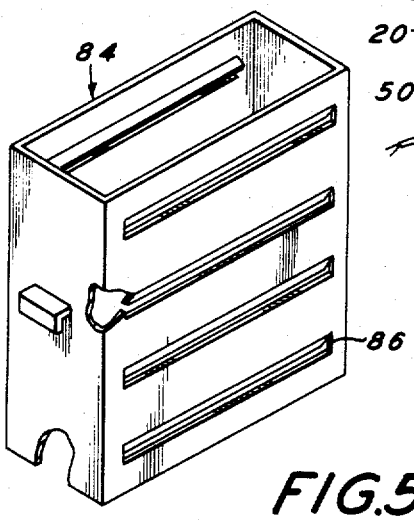
FIG.5

FLOW THROUGH TYPE DRYING APPARATUS

Matter enclosed in heavy brackets [ ] appears in the original patent but forms no part of this reissue specification; matter printed in italics indicates the additions made by reissue.

This invention relates to a drying apparatus, and more particularly, to a flow through type drying apparatus which may be utilized for vacuum or freeze drying of various products.

Heretofore, it has been conventional in the art relating to drying apparatus to vacuum dry or freeze dry products on a batch basis. That is, a housing was provided and trays or containers of the product to be dried were placed in the housing. At the completion of the cycle, the trays or containers of the product were removed from the housing and a new batch of the product was placed within the housing. Such apparatus suffers from the defect that excess material handling is required.

The apparatus of the present invention overcomes the disadvantage of the prior art by providing a drying apparatus which requires a minimum of material handling. This is accomplished by making the apparatus a flow through type. By the terminology "floor through type," is meant that the products to be dried are placed into a housing from one end thereof and removed from an opposite end in a manner which eliminates the necessity for discrete trays or containers which support the products before, during and after the drying cycle. Preferably, the products to be dried are fed into the drying apparatus from a hopper or the like. Also, the housing is preferably provided with a movable closure means which enables the dried product to be removed from the housing due to gravity.

The drying apparatus of the present invention may be utilized for vacuum drying or freeze drying. As is well known to those skilled in the art, vacuum drying embraces the concept of subjecting articles to a reduced pressure and a temperature above room temperature. Freeze drying comprehends subjecting frozen articles to an evacuated atmosphere and a controlled elevated temperature for a sufficient length of time so that all moisture in the articles will be sublimed. Hence, the moisture in the frozen articles will change from a solid to a vapor state without passing through a transition phase wherein the moisture is a liquid. Any one of a wide variety of articles may be freeze dried in accordance with the present invention. For example, the present invention may be utilized to freeze dry food products, coffee, pharmaceuticals, blood, milk, biological specimens, fruit extracts, etc.

Industry is making wide use of freeze drying techniques. Freeze drying of products is desirable since it permits the products to be stored almost indefinitely without refrigeration. Food products may be processed in this manner without impairment or loss of fresh natural flavor, vitamin content, quality, etc.

It is an object of the present invention to provide a novel drying apparatus.

It is another object of the present invention to provide a novel drying apparatus of the flow through type which substantially reduces the amount of materials handling required.

It is another object of the present invention to provide a novel drying apparatus which is designed so that articles or products to be dried are inserted into a housing from one end thereof and removed from an opposite end thereof.

It is another object of the present invention to provide a novel drying apparatus wherein dried products are permitted to be removed from the apparatus by the gravitational effect thereon.

It is another object of the present invention to provide a novel drying apparatus which may be in modular form.

It is another object of the present invention to provide a novel drying apparatus wherein a bottom wall of a housing constitutes a discharge control member for products which have been dried.

It is another object of the present invention to provide a novel freeze drying apparatus which substantially reduces material handling before and after the drying cycle.

It is another object of the present invention to provide a drying apparatus which facilitates mechanical conveyance of articles to and from the apparatus.

Other objects will appear hereinafter.

For the purpose of illustrating the invention there is shown in the drawings forms which are presently preferred; it being understood, however, that this invention is not limited to the precise arrangements and instrumentalities shown.

FIG. 2 is a sectional view taken along the lines 2—2 in FIG. 1.

FIG. 3 is a sectional view taken along the lines 3—3 in FIG. 1.

FIG. 4 is an enlarged sectional view taken along the lines 4—4 in FIG. 3.

FIG. 5 is a perspective view of another embodiment of the container which may be utilized with the apparatus of the present invention.

Referring to the drawing in detail, wherein like numerals indicate like elements, there is shown in FIG. 1 a drying apparatus designated generally as 10.

Figure 1:
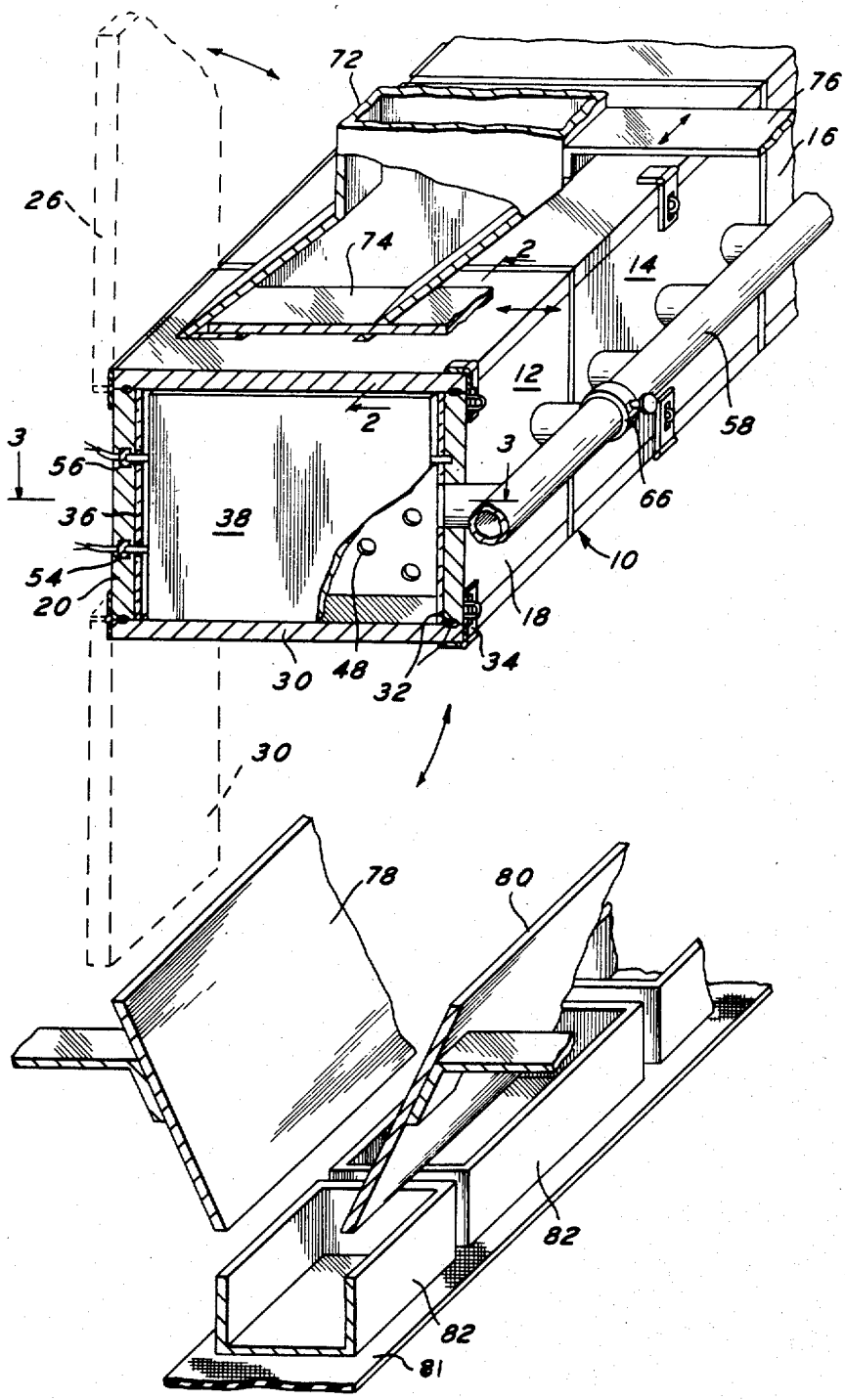
FIG. 1 is a partial perspective view of the apparatus of the present invention.

The apparatus 10 may include a plurality of housings 12–16 interconnected in modular form. For the purposes of the present discussion, only housing 12 will be described in detail. It will be appreciated that the housings 14 and 16 are identical with housing 12. By making the housings in modular form, any desired number of housings may be interconnected and utilized with a single exhaust system as dictated by production requirements.

As shown more clearly in FIGS. 2 and 3, the housing 12 is provided with a front wall 18 and a back wall 20 interconnected by side walls 22 and 24. The housing 12 is provided with a top wall 26. The top wall 26 has one edge pivotally secured to the rear wall 20 by means of a hinge or the like thereby facilitating movement of the top wall 26 to the phantom position illustrated in FIG. 1.

The housing 12 is provided with a bottom wall 30 which is likewise pivotably secured to the rear wall 20. Hence, the bottom wall 30 may be pivoted to the phantom disposition illustrated in FIG. 1. The inner surface of the top wall 26 is provided with a deformable gasket 28 which is adapted to cooperate with the upper edge of the front, rear and side walls thereby providing a hermetic seal in the closed disposition of the top wall 26. A similar gasket 32 is provided for the bottom wall 30. Any suitable device may be provided to releasably secure the top and bottom walls in their closed disposition. For example, a conventional hasp 34 may be provided as illustrated more clearly in FIG. 1.

As shown more clearly in FIGS. 2 and 3, the interior of the housing 12 is preferably provided with a layer of reflective material 36. The layer of reflective material 36 reduces the tendency of the housing 12 to absorb heat as will be made clear hereinafter. A source of heat is provided adjacent the side walls 22 and 24 and in a central portion of the housing 12 substantially equidistant from the side walls 22 and 24. Such source of heat may be a hollow flat housing through which steam or hot water may be circulated. As illustrated, the source of heat comprises electrical heater panels 38, 40 and 42.

The disposition of the heater panels results in a chamber on opposite sides of panel 40. A container 44 is supported between the panels 38 and 40. A similar container 46 is supported between the panels 40 and 42. The containers 44 and 46 are open at opposite ends and form a part of housing 12. As shown more clearly in FIG. 2, the containers 44 and 46 lack a top wall and a bottom wall and having their bottom edge resting on wall 30. The side walls of the containers 44 and 46 which are juxtaposed to a heater panel are provided with a plurality of spaced apertures 48. The purpose of the apertures 48 will be made clear hereinafter.

The containers 44 and 46 may be supported within the housing 12 in any one of a wide variety of manners. For purposes of illustration, the containers 44 and 46 are provided with a bracket 50 which rests on a bracket 52 extending inwardly from the walls of the housing 12 as shown more clearly in FIG. 4. While only two containers are illustrated in association with housing 12, it will be appreciated that one or more containers may be utilized. If a large number of containers are utilized in the housing 12, the efficiency of the apparatus is greatest when a heater panel is juxtaposed to an apertured side wall of each container.

The manner in which electricity is coupled to the heater panels 38–42 may assume a wide variety of forms. For purposes of illustration, the rear wall 20 is provided with electrical receptacles 54 and 56 into which a stud on the panels extend thereby coupling electricity to the panels. A stud made from an electrically non-conductive material extends from the opposite end of the heater panels for facilitating mounting of the panels in spaced parallel planes as shown by comparison of FIGS. 2 and 3.

A means is provided to selectively reduce the pressure within the housing 12. Such means includes a manifold 58 which is in communication with the interior of housing 12 my means of pipes 60, 62 and 64. As illustrated, the pipes 60–64 extend through the front wall 18. It will be appreciated that the pipes could extend through the rear wall 20 if desired. The important relationship of the pipes 60, 62 and 64 resides in the pipes communicating with the interior of the housing 12 in the region between the perforated side walls of the containers and the heater plates. Hence, pipe 62 communicates with the interior of the housing 12 in the region between the juxtaposed side walls of the containers 44 and 46 and the heater pipe 40. The purpose for this relationship will be made clear hereinafter.

When a plurality of housings such as housings 12, 14, and 16 are interconnected in modular form, it may be desirable to provide a selectively operable valve 66 in the manifold 58. The manifold 58 is in communication with a condenser 68. A vacuum pump 70 is in communication with the manifold 58 through the condenser 68. If desired, two condensers may be utilized in parallel so that one condenser may be connected to the system while the other condenser is being frosted.

The material to be dried is preferably in powdered or granular form. Such material may be disposed within the hopper 72 having a discharge control member 74. Member 74 may be a selectively operable valve or the like. The hopper 72 is preferably supported by a bracket 76 on a mobile vehicle which may be moved to a disposition so that the discharge opening of the hopper 72 will be over one of the containers 44 and 46.

Guide plates 78 and 80 may be disposed beneath the housing 12. The plates 78 and 80 may be disposed at an angle so as to cause dried products to funnel into one of a plurality of receptacles 82 supported by an intermittently operated conveyer 81. Any one of a wide variety of means may be provided to receive the dried product or feed the product to be dried into the containers 44 and 46.

In FIG. 5, there is disclosed an alternative embodiment for the containers. Hence, the container 84 may be substituted for the containers 44 and 46. The container 84 differs from the containers 44 and 46 by having elongated vent openings 86 in its major side walls. The vents 86 are provided by bending a lip portion of the side wall of the container 84 inwardly. In this manner, small shields are provided which reduce the tendency of the product to be dried to flow out of the container. Such tendency exists when the product is in powdered form.

The apparatus 10 is utilized as follows:

The apparatus 10 may be utilized as a vacuum drying apparatus or a freeze drying apparatus. For purposes of illustration, the description hereinafter will be directed to use of the apparatus 10 for freeze drying products. The products to be freeze dried is preferably in powdered or granular form and in a frozen state. In this frozen state, the product to be freeze dried is conveyed and discharged into the hopper 72. The bottom wall 30 will be in its closed disposition as illustrated in FIGS. 1 and 2. The top wall 26 will be in the phantom position illustrated in FIG. 1. Thereafter, the control member 74 will be manipulated so as to sequentially fill the containers 44 and 46 with the product to be freeze dried.

Thereafter, the top wall 26 will be closed, a control means will be activated to cause the panels 38, 40 and 42 to radiate heat, and vacuum pump 70 will be initiated. The product to be freeze dried will be subjected to a reduced pressure and an elevated temperature for a controlled period of time according to empirical formulas well known to those skilled in the art depending upon the nature of the product. As a result of the reduced pressure, and the elevated temperature, the ice in the frozen product is caused to sublime. The resultant moisture exits from the containers 44 and 46 through the apertures 48 and is removed by the condenser 68.

The ability of the product to absorb radiant heat from the panels 38–42 is increased by making the containers 44 and 46 so that they have a high emissivity. Preferably the containers 44 and 46 are colored black. Heat from the panels 38–42 is reflected away from the walls of the housing 12 by means of the layer 36. Preferably, the color of the layer 36 is white.

After the drying cycle has been completed, the pump 70 may be stopped and the current for the panels 38–42 may be interrupted. Thereafter, the bottom wall 30 will be manipulated to the phantom position illustrated in FIG. 1. As the bottom wall 30 is pivoted to its open disposition, the dried product falls due to gravity. The guide plates 78 and 80 funnel the dried product into a suitable receptacle 82. A further decrease in material handling may be accomplished by providing the receptacles 82 on an intermittently operated conveyor 81. However, it will be appreciated that any suitable receptacle may be utilized to collect the dried product.

Thereafter, the above sequence of events may be repeated. Hence, it will be seen that the necessity for providing trays or other containers which are manually placed into and removed from the drying apparatus is eliminated thereby substantially reducing the material handling prior to and after the drying cycle.

The present invention may be embodied in other specific forms without departing from the spirit or essential attributes thereof and, accordingly, reference should be made to the appended claims, rather than to the foregoing specification as indicating the scope of the invention.

I claim:

1. A product flow through drying apparatus comprising a regular parallelepiped housing, upper and lower ends of said housing having selectively movable portions so that products to be dried may be inserted into the housing from an upper end and removed from a lower end, an open ended container within said housing and supported thereby, said container being adapted to receive a product at its upper end and permit discharge of the product through its lower end, opposite sides of said container having apertures providing open communication between the interior of said container and the interior of said housing, heating panels juxtaposed to the apertured sides of said container for radiantly heating product within said container, said heating panels being disposed in spaced apart relation between the apertured opposite sides and the adjacent side walls of the housing, and means coupled to said housing for reducing the pressure within said housing and said container, said last-mentioned means including conduit means communicating with the interior of said housing through a wall perpendicular to the said adjacent walls, said conduit means being positioned on said perpendicular wall so as to be aligned in communication with the open space between said heater panels and said apertured sides of said container.

2. A drying apparatus in accordance with claim 1 wherein the movable portions of the ends of said housing constitute the entire top and bottom walls of said housing.

3. A drying apparatus in accordance with claim 1 wherein the upper end of said container is spaced from the top wall of said housing so that the upper end of said container is in open communication with the interior of said housing.

4. A drying apparatus in accordance with claim 1 including means pivotably mounting said top and bottom walls on said housing, and latch means for selectively retaining said bottom wall in a closed disposition.

5. Apparatus in accordance with claim 1 wherein the apertures in the sides of said container are elongated, integral lip portions of said container sides extending inwardly from the upper edge of the elongated apertures, whereby said lip portions assist in preventing a product being dried from flowing freely out of the container by way of the aperture.

6. A product flow through drying apparatus comprising a regular parallel piped housing, a selectively operable top wall means on said housing for providing for the selective introduction of a product into said housing, a selectively operable bottom wall means on said housing providing for the selective discharge of a product from said housing, first and second spaced container within said housing, said containers being adapted to receive a product at the upper end and permit discharge of the product through the lower end, said containers being rectangular in transverse section and spaced from the side walls of said housing, each container having apertures in a pair of opposite sides, said containers being disposed side by side within said housing, means on said housing side wall for supporting each container so that the lowermost edge is juxtaposed to the bottom wall means whereby a product in said container will be supported by said bottom wall, the upper edges of said containers being spaced from the top wall means for said housing so that each container is in open communication with the interior of said housing, said bottom wall means having a movable portion at least as large as the combined cross-sectional area of said containers, each container being open at the upper and lower ends thereof, a heating panel juxtaposed adjacent apertured sides of said containers for radiantly heating a product within said containers, and an additional panel being juxtaposed to the opposite apertured side of each of said containers whereby three heater panels are within said housing, and means for selectively reducing the pressure within said housing, said means for selectively reducing the pressure within said housing including at least three conduits communicating with said housing through walls perpendicular to the apertured sides of said containers at points generally aligned with the open space between said heater panels and said apertured sides.

7. Apparatus is accordance with claim 6 wherein said apertures in the sides of each container are elongated, integral lip portions of the container sides extending inwardly from the upper edge of the elongated apertures, whereby said lip portions assist in preventing a product being dried from flowing freely out of the containers by way of the apertures.

*8. Apparatus for bulk freeze-drying of heat-sensitive material which has been frozen into a granular particle form comprising a series of aligned and substantially vertical product cells separated by open spaces having substantially the same height and length as said cells, said cells having opposed walls of relatively large surface area in relation to the thickness of said cells, said walls being permeable to free passage of water vapor into said open spaces; means for sealing said product walls from atmosphere; vacuum means for lowering the pressure in the open spaces adjacent to each product retaining wall to assure sublimation into said spaces; means for applying heat to provide heat of sublimation; means for removal of water vapor; and means for discharging said product from the vertical product beds by the force of gravity.*

*9. The apparatus of claim 8 wherein the vertical cells are in the form of elongated, substantially rectangular product retaining cells; the walls of said cells having a sufficient number of openings therein for free passage of water vapor to the open spaces.*

* * * * *